CLYDE W. WEHR
INVENTOR.

BY Leonard W. Treash
Robert W. Hampton
ATTORNEYS

United States Patent Office 3,438,689
Patented Apr. 15, 1969

3,438,689
ZOOM TELESCOPIC FINDER
Clyde W. Wehr, Rochester, N.Y., assignor to Eastman Kodak Company, Rochester, N.Y., a corporation of New Jersey
Filed Jan. 24, 1967, Ser. No. 611,398
Int. Cl. G02b 7/04, 7/10
U.S. Cl. 350—42          6 Claims

ABSTRACT OF THE DISCLOSURE

A telescopic optical system suitable for a camera finder with an objective having, in order, negative, positive and positive components for creating an inverted real image and an erector which relays the image to an image plane for viewing with an eyepiece, the middle component of the objective and the erector being movable as a unit for optically compensated zooming.

---

This invention relates to zoom optical systems and particularly to telescopic zoom optical systems suitable for use in the viewfinders of motion picture and still cameras.

U.S. 3,043,181, Brown, shows a telescopic reflex finder for use with a zoom taking lens on a motion picture camera. This finder gives a high quality, parallax-free image having a field corresponding accurately to that of the taking lens. It is costly to manufacture and requires a taking lens having a design such that it can afford to contribute light to a viewfinder.

U.S. 2,945,415, Bechtold; U.S. 2,578,574, Miles; and U.S. 2,859,654, Back, show examples of a type of zoom finder which changes the magnification of a virtual image to correspond to changes in the magnification of the taking lens. Since this type of finder works with a virtual image, any framing device used must be projected into the image plane to be clearly defined. Zoom finders of this type generally move only one component for zooming, thereby giving a focus shift requiring substantial accommodation by the eye.

U.S. 3,045,545, Korones, shows a telescopic zoom lens. Telescopic zoom lenses generally move one of the main components for zooming and compensate for focus shift with a differential movement of a component in either the eyepiece or the erector. Effecting such differential movement substantially increases the cost of manufacture for a finder.

U.S. 2,454,686, Back, shows an optically compensated zoom lens that could be adapted to a zoom telescope if an eyepiece is substituted for its last relay. Its movable lens portions are substantially field lenses which move across two image planes during zooming. Since it is optically compensated, the zoom mechanism necessary is inexpensive and well within the range of camera finders. On the other hand, it has twenty-two lens elements, which could be reduced to eighteen elements with the substitution of an eyepiece. In addition, it is an extremely long system, not well suited for a compact adaptation like modern motion picture cameras.

It is an object of this invention to provide a compact, inexpensive zoom telescope.

It is another object of this invention to provide a zoom telescope suitable for use as a finder on motion picture and still cameras.

Other objects of this invention are:

To provide a zoom finder with a mask clearly defined in a real image plane, which mask is effective despite substantial eye movement;

To provide a zoom telescopic finder having a stationary front element and a total of as few as four lens elements, exclusive of the eyepiece;

To provide a zoom telescopic finder having an acceptable amount of focus shift during zooming without mechanical compensation; and To provide a zoom telescopic finder capable of changing magnification through a range suitable for a motion picture camera with actual movement of lens components kept to a minimum, for example less than .3 inch.

Other objects of the invention will appear from the following detailed description, reference being made to the accompanying drawings, wherein.

According to all of the drawings and examples, from front to rear, the components are numbered by Roman numerals, the lens elements by Arabic numerals, the radii, thicknesses and separations by subscripts to the letters R, $t$ and S. The indexes of refraction N are for the D line of the spectrum and V is the dispersive index.

Figure 1:
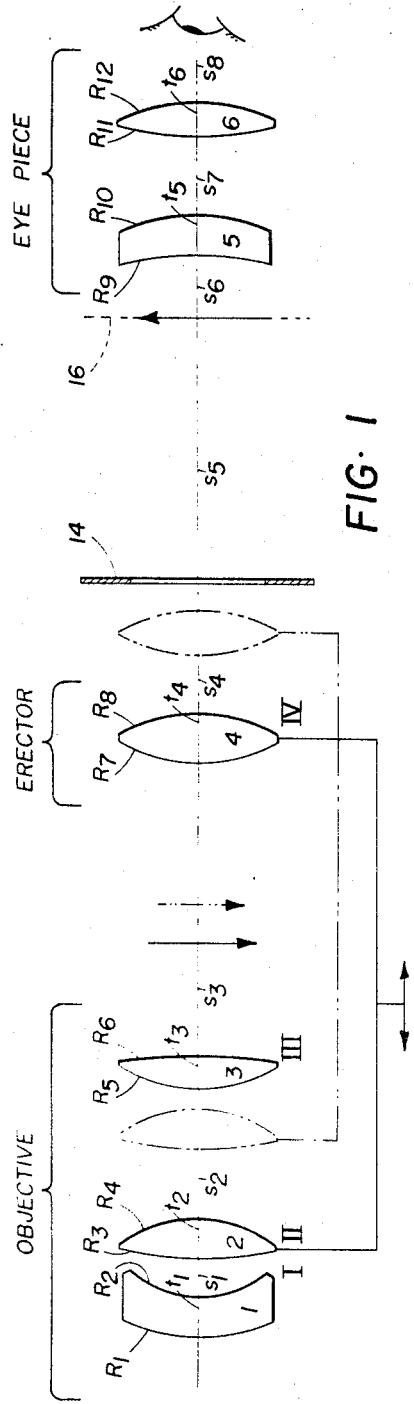
FIGS. 1 and 2 are diagrammatic cross sections of zoom viewfinders constructed according to the invention.
Figure 2:
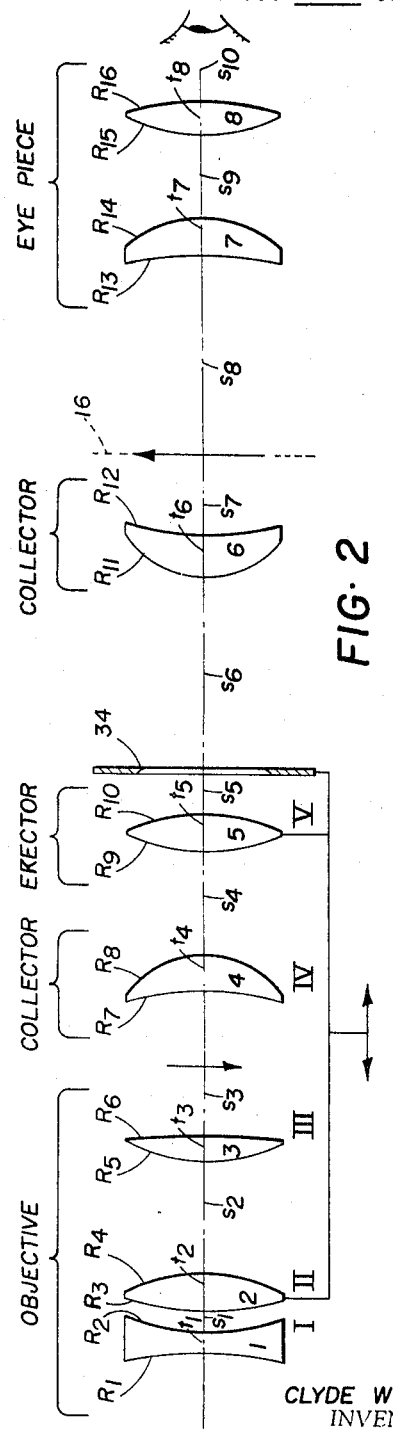

In FIGS. 1 and 2 a zoom telescope is comprised of at least three optical members, an objective, an erector and an eyepiece. The objective is made up of a stationary front negative component I, a stationary rear positive component III and a movable positive component II, therebetween. The erector is made up of one or more positive components. The finder may also contain field lenses or collector lenses as shown with components IV and VI in FIG. 2.

Figure 3:
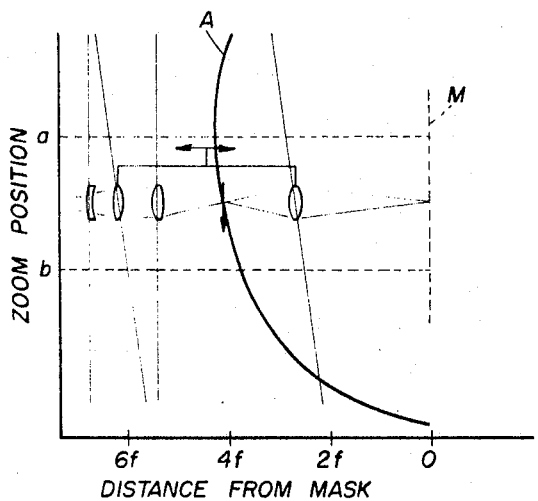
FIGS. 3 and 4 are graphs showing the type of relative movement each of the moving components of FIG. 1 imparts to a real image.
Figure 4:
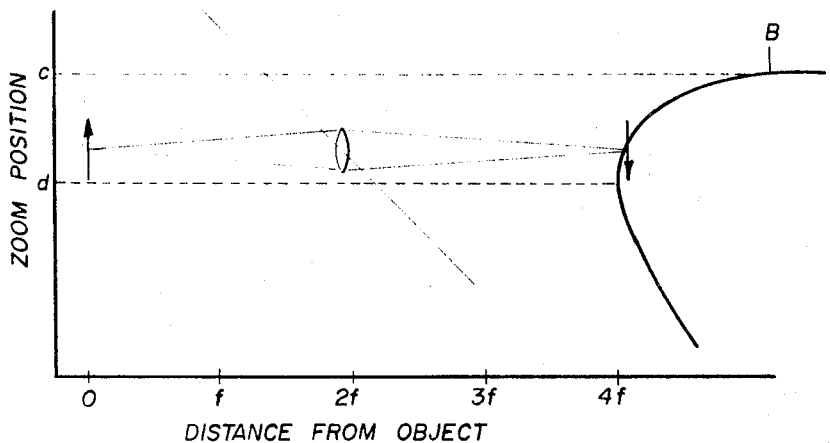

According to the invention the movable component in the objective is mechanically coupled to a movable component in the erector for unitary movement. The movement of the movable component in the objective causes a substantial magnification change at a first real image plane. It also causes substantial shift of that image plane. This is shown by curve A in FIG. 3. A curve of this shape is customary for the focus shift when a positive element is moved between a negative and positive component. As is well known in the art, the negative component is used to create a virtual image of the scene giving the system a subject placed at a finite distance from the objective. The negative element could be replaced by a positive element placed a substantial distance in front of the objective to create a real image at the same position as the negative element creates a virtual image, but such a positive component would add a large amount of overall length to the system. The part between the horizontal dotted lines $a$ and $b$ on this curve is not highly curved and the motion of the image is in the same direction as component II, but not as fast. If just this part of the curve is used, this focus shift can be compensated for by a single moving erector component. The focus shift resulting from moving a single positive component away from a stationary object is shown by curve B in FIG. 4 where $f$ is the focal length of the positive component. Using just the part of this curve between the dotted lines $c$ and $d$ will provide an image which moves in a direction opposite to the motion of the erector. With a proper choice of spacings and powers, the erector can be made to substantially compensate for the movement of the first image while moving at the same speed as component II. Picking of these spacings and powers can be done by trial and error. A random zoom telescope can be readily designed this way, but such work is laborious when a particular overall length, range, and amount of movement is desired. For such specific designing, the formulas used for ordinary four component zoom systems are applicable. Although these formulas have generally been applied to zoom systems of the type giving a single inverted real image using alternate positive and negative components, they will work with this zoom system using only a front negative component with three positive components and with the formation of a real image between the rear two components.

The following examples give constructional data for manufacture of three finders according to the invention:

EXAMPLE 1 (FIG. 1)

| Element | $N_D$ | V | $R_1$–$R_{12}$ in inches | $S_1$–$S_8$ in inches | $t_1$–$t_6$ in inches |
|---|---|---|---|---|---|
| 1 | 1.567 | 36.6 | $R_1$=.51<br>$R_2$=.33 | | $t_1$=.069 |
| | | | | $S_1$ varies from .060 to .345 | |
| 2 | 1.492 | 57.4 | $R_3$=1.49<br>$R_4$=–.37 | | $t_2$=.091 |
| | | | | $S_2$ varies from .390 to .105 | |
| 3 | 1.492 | 57.4 | $R_5$=.44<br>$R_6$=–3.62 | | $t_3$=.084 |
| | | | | $S_3$ varies from 1.40 to 1.68 | |
| 4 | 1.492 | 57.4 | $R_7$=.69<br>$R_8$=–.62 | | $t_4$=.082 |
| | | | | $S_4$ varies from .315 to .03 | |
| Stop Mask | | | | $S_5$=1.23<br>$S_6$=.55 | |
| 5 | 1.492 | 57.4 | $R_9$=–2.8<br>$R_{10}$=–.63 | | $t_5$=.10 |
| | | | | $S_7$=.35 | |
| 6 | 1.492 | 57.4 | $R_{11}$=.98<br>$R_{12}$=2.38 | $S_8$=1.05 | $t_6$=.10 |

In this example, the stop is stationary as shown in FIG. 1. The motion of the movable components is .285 inches to effect a change in magnification at the mask of from .87 to .42. The real image formed between the objective and the erector moves from .26 to .33 inches behind element 3.

The elements in all examples are designed to have an index of refraction suitable for use of plastic elements. The use of a negative first element allows a correction for chromatic aberration, a feature often omitted in finders in an effort to reduce cost and increase compactness with positive power.

A finder constructed according to Example 1 is low cost, compact and gives a sharp image with maximum deviation at the mask of .008 inch. In addition, the front element is stationary eliminating the need for an additional front plate.

EXAMPLE 2 (FIG. 2)

| Element | $N_D$ | V | $R_1$–$R_{16}$ in inches | $S_1$–$S_{10}$ in inches | $t_1$–$t_8$ in inches |
|---|---|---|---|---|---|
| 1 | 1.49 | 57.4 | $R_1$=–3.13<br>$R_2$=8.2 | | $t_1$=.069 |
| | | | | $S_1$ varies from 0.90 to .375 | |
| 2 | 1.49 | 57.4 | $R_3$=1.30<br>$R_4$=–.49 | | $t_2$=.123 |
| | | | | $S_2$ varies from .375 to .090 | |
| 3 | 1.49 | 57.4 | $R_5$=.46<br>$R_6$=18.9 | | $t_3$=.112 |
| | | | | $S_3$=.712 | |
| 4 | 1.49 | 57.4 | $R_7$=–1.35<br>$R_8$=–.275 | | $t_4$=.123 |
| | | | | $S_4$ varies from .292 to .58 | |
| 5 | 1.49 | 57.4 | $R_9$=.64<br>$R_{10}$=–.64 | | $t_5$=.123 |
| Stop | | | | $S_5$=.055 | |
| | | | | $S_6$ varies from .72 to .45 | |
| 6 | 1.49 | 57.4 | $R_{11}$=.275<br>$R_{12}$=1.35 | | $t_6$=.123 |
| Mask | | | | $S_7$=.260 | |
| | | | | $S_8$=.61 | |
| 7 | 1.49 | 57.4 | $R_{13}$=–3.1<br>$R_{14}$=–.71 | | $t_7$=.131 |
| | | | | $S_9$=.40 | |
| 8 | 1.49 | 57.4 | $R_{15}$=1.11<br>$R_{16}$=–2.70 | $S_{10}$=.70 | $t_8$=.131 |

In Example 2, the stop is movable with element 5 as shown in FIG. 2. The collector lenses, elements 4 and 6 add additional expense to the system, but also add compactness and reduce curvature of field. They are readily inserted in the design by treating them as ordinary magnifiers giving a virtual image of the respective image planes creating an object with which the erector, element 5 can work. Movement of .285 inch changes magnification from .90 to .42.

EXAMPLE 3

| Element | $N_D$ | V | $R_1$–$R_{12}$ in inches | $S_1$–$S_8$ in inches | $t_1$–$t_6$ in inches |
|---|---|---|---|---|---|
| 1 | 1.49 | 57.4 | $R_1$=–3.33<br>$R_2$=.87 | | $t_1$=.065 |
| | | | | $S_1$ varies from .075 to .36 | |
| 2 | 1.49 | 57.4 | $R_3$=1.11<br>$R_4$=–.42 | | $t_2$=.115 |
| | | | | $S_2$ varies from .36 to .075 | |
| 3 | 1.49 | 57.4 | $R_5$=.45<br>$R_6$=18.4 | | $t_3$=.105 |
| | | | | $S_3$ varies from 1.50 to 1.79 | |
| 4 | 1.49 | 57.4 | $R_7$=.63<br>$R_8$=–.72 | | $t_4$=.085 |
| Stop | | | | $S_4$=.055 | |
| | | | | $S_5$ varies from 1.53 to 1.25 | |
| Mask | | | | $S_6$=.54 | |
| 5 | 1.49 | 57.4 | $R_9$=–2.78<br>$R_{10}$=–.63 | | $t_5$=.116 |
| | | | | $S_7$=.35 | |
| 6 | 1.49 | 57.4 | $R_{11}$=.98<br>$R_{12}$=–2.38 | $S_8$=1.20 | $t_6$=.116 |

In Example 3, the stop moves with element 5 as in Example 2. In Examples 2 and 3, all elements are constructed of the same material giving no color correction. Magnification with a motion of .285 inch will vary from .87 to .41.

Figure 5:
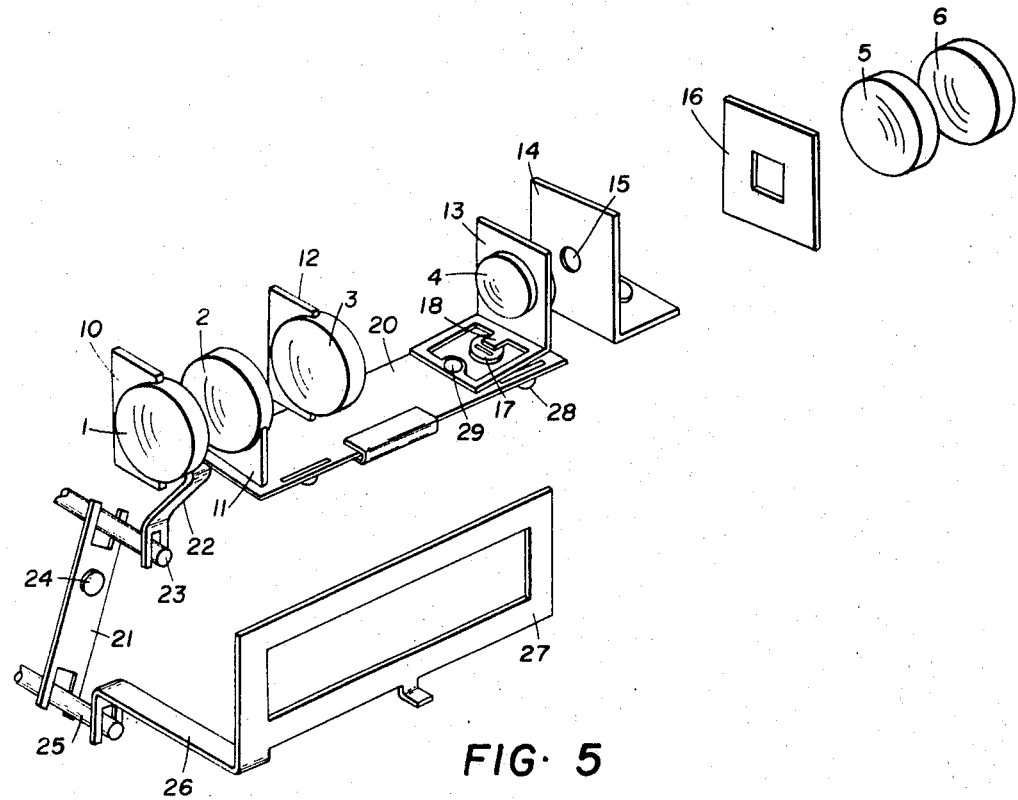
FIG. 5 is a perspective view of a finder constructed according to FIG. 1 and including its mounting and zooming mechanism.

In FIG. 5 is disclosed a simple, low-cost, zoom mechanism adapted to link zoom motion in a taking lens to zoom motion in a viewfinder constructed according to FIG. 1 and Example 1. In FIG. 5, lens elements 1, 2, 3 and 4 are held in place by mounts 10, 11, 12 and 13, respectfully. Mounts 10 and 12 are secured to a housing, not shown, while mounts 11 and 13 are secured to a slidable member 20. Member 20 is capable of sliding longitudinally on balls 28 and within a guide 19. Member 20 is linked to a taking lens, not shown, by an arm 22 which receives motion from a pin 23 which is connected to a moving component, not shown, of the taking lens. Pin 23 is moved as part of a normal zoom mechanism beginning with actuation of a slide 27 connected by an arm 26 to a pin 25 which is in turn connected to a lever 21 which rotates about a stationary fulcrum 24. When slide 27 is moved by a camera operator, zooming components in the taking lens connected to pins 25 and 23 are moved. By the linkage through arm 22, slidable member 20 moves at the same rate and direction as pin 23, thereby effecting a change in magnification in the viewfinder corresponding to that of the taking lens.

Also shown in FIG. 5 is a stop 14 defining an aperture 15. A mask 16 is placed in the rear most image plane where it may be viewed by an eyepiece made up of elements 5 and 6. Eyepiece elements 5 and 6 may be adjustable by allowing movement toward or away from the mask 16 to accommodate the system for an individual eye.

Also shown in FIG. 5 is a convenient factory adjustment mechanism for vertical and horizontal point for the finder. This factory adjustment mechanism includes an eccentric 17 which on rotation raises or lowers a tab 18 connected to the mount 13 for lens element 4, thereby changing the vertical point of element 4. Horizontal point is adjusted by rotating mount 13 around a rivet 29.

For all purposes herein, the front and rear of an optical system shall be the portions away from and near the eyepiece, respectively, and a radius of curvature of a surface shall be considered positive when its center of curvature is rearward from the surface.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A zoom optical system useful in telescope, said optical system comprising, from front to rear in optical alignment,
    (A) an objective for forming a first real image of an object, said objective having,
        (1) a front negative component
        (2) a rear positive component
        (3) a first movable positive component, positioned between said front and rear components and movable through a distance from front to rear, said distance being such that said real image will move a distance in the same direction as said movable component,
    (B) an erector positioned to the rear of said first real image for forming a second real image of said first real image said erector having a movable positive component mechanically coupled for equal movement with the movable positive component of said objective and having a power and being so spaced from said objective that said second real image is maintained in approximately the same plane despite motion of said movable components.

2. A variable field viewfinder for a camera which camera has a variable focal length main objective, said viewfinder comprising
    (A) an objective for forming an inverted first real image of a scene, said objective having, optically aligned from front to rear
        (1) a fixed negative component
        (2) a movable positive component
        (3) a fixed positive component
    (B) an erector optically aligned with said objective to the rear of said first real image for erecting said first real image and relaying it to a real image plane, said first erector having a movable positive component,
    (C) connecting means for causing said movable positive components to maintain a fixed distance apart,
    (D) means to move said movable positive components in conjunction with the change in focal length of said main objective.

3. A zone viewfinder according to claim 2 constructed from a scaling of the following data where 1–6 are lens elements, $N_D$ is the index of refraction for the D line of the spectrum, V is the dispersive index, $R_1$–$R_{12}$ are the radii of curvature, $t_1$–$t_6$ are the spacings, all numbering running from front to rear:

EXAMPLE 1 (FIG. 1)

| Element | $N_D$ | V | $R_1$–$R_{12}$ in inches | $S_1$–$S_8$ in inches | $t_1$–$t_6$ in inches |
|---|---|---|---|---|---|
| 1 | 1.567 | 36.6 | $R_1$=.51 $R_2$=.33 | $S_1$ varies from .060 to .345 | $t_1$=.069 |
| 2 | 1.492 | 57.4 | $R_3$=1.49 $R_4$=−.37 | $S_2$ varies from .390 to .105 | $t_2$=.091 |
| 3 | 1.492 | 57.4 | $R_5$=.44 $R_6$=−3.62 | $S_3$ varies from 1.40 to 1.68 | $t_3$=.084 |
| 4 | 1.492 | 57.4 | $R_7$=.69 $R_8$=−.62 | $S_4$ varies from .315 to .03 | $t_4$=.082 |
| Stop Mask | | | | $S_5$=1.23 $S_6$=.55 | |
| 5 | 1.492 | 57.4 | $R_9$=−2.8 $R_{10}$=−.63 | $S_7$=.35 | $t_5$=.10 |
| 6 | 1.492 | 57.4 | $R_{11}$=.98 $R_{12}$=2.38 | $S_8$=1.05 | $t_6$=.10 |

4. A zoom viewfinder according to claim 2 constructed from a scaling of the following data where 1–8 are lens elements, $N_D$ is the index of refraction for the D line of the spectrum, V is the dispersive index, $R_1$–$R_{16}$ are the radii of curvature, $t_1$–$t_8$ are the lens element thicknesses and $S_1$–$S_{10}$ are the spacings, all numbering running from front to rear:

EXAMPLE 2 (FIG. 2)

| Element | $N_D$ | V | $R_1$–$R_{16}$ in inches | $S_1$–$S_{10}$ in inches | $t_1$–$t_8$ in inches |
|---|---|---|---|---|---|
| 1 | 1.49 | 57.4 | $R_1=-3.13$<br>$R_2=.2$ | | $t_1=.069$ |
| | | | | $S_1$ varies from .090 to .375 | |
| 2 | 1.49 | 57.4 | $R_3=1.30$<br>$R_4=-.49$ | | $t_2=.123$ |
| | | | | $S_2$ varies from .375 to .090 | |
| 3 | 1.49 | 57.4 | $R_5=.46$<br>$R_6=18.9$ | | $t_3=.112$ |
| | | | | $S_3=.712$ | |
| 4 | 1.49 | 57.4 | $R_7=-1.35$<br>$R_8=-.275$ | | $t_4=.123$ |
| | | | | $S_4$ varies from .292 to .58 | |
| 5 | 1.49 | 57.4 | $R_9=.64$<br>$R_{10}=-.64$ | | $t_5=.123$ |
| Stop | | | | $S_5=.055$ | |
| | | | | $S_6$ varies from .72 to .45 | |
| 6 | 1.49 | 57.4 | $R_{11}=.275$<br>$R_{12}=1.35$ | | $t_6=.123$ |
| Mask | | | | $S_7=.260$ | |
| | | | | $S_8=.61$ | |
| 7 | 1.49 | 57.5 | $R_{13}=-3.1$<br>$R_{14}=-.71$ | | $t_7=.131$ |
| | | | | $S_9=.40$ | |
| 8 | 1.49 | 57.4 | $R_{15}=1.11$<br>$R_{16}=-2.70$ | | $t_8=.131$ |
| | | | | $S_{10}=.70$ | |

5. A zoom viewfinder according to claim 2 constructed from a scaling of the following data where 1–6 are lens elements, $N_D$ is the index of refraction for the D line of the spectrum, V is the dispersive index, $R_1$–$R_{12}$ are the radii of curvature, $t_1$–$t_6$ are the lens element thicknesses and $S_1$–$S_8$ are the spacings, all numbering running from front to rear:

EXAMPLE 3

| Element | $N_D$ | V | $R_1$–$R_{12}$ in inches | $S_1$–$S_8$ in inches | $t_1$–$t_6$ in inches |
|---|---|---|---|---|---|
| 1 | 1.49 | 57.4 | $R_1=-3.33$<br>$R_2=.87$ | | $t_1=.065$ |
| | | | | $S_1$ varies from .075 to .36 | |
| 2 | 1.49 | 57.4 | $R_3=1.11$<br>$R_4=-.42$ | | $t_2=.115$ |
| | | | | $S_2$ varies from .36 to .075 | |
| 3 | 1.49 | 57.4 | $R_5=.45$<br>$R_6=18.4$ | | $t_3=.105$ |
| | | | | $S_3$ varies from 1.50 to 1.79 | |
| 4 | 1.49 | 57.4 | $R_7=.63$<br>$R_8=-.72$ | | $t_4=.085$ |
| Stop | | | | $S_4=.055$ | |
| Mask | | | | $S_5$ varies from 1.53 to 1.25 | |
| 5 | 1.49 | 57.4 | $R_9=-2.78$<br>$R_{10}=-.63$ | $S_6=.54$ | $t_5=.116$ |
| | | | | $S_7=.35$ | |
| 6 | 1.49 | 57.4 | $R_{11}=.98$<br>$R_{12}=-2.38$ | | $t_6=.116$ |
| | | | | $S_8=1.20$ | |

6. A zoom optical system comprising, from front to rear:
   lens means for creating a stationary image of a scene at a finite stationary position,
   a first movable positive component,
   a stationary positive component,
   a second movable positive component, and
   said movable positive components being coupled together for equal movement through a given distance and being of such powers and spacings that a first real image is formed of said stationary image between said stationary positive component and said second movable positive component and a second real image of said first real image is formed rearward of said second movable positive component which image remains substantially in focus in a plane while said movable components are moved through said given distance.

References Cited

UNITED STATES PATENTS

| | | | |
|---|---|---|---|
| 2,454,686 | 11/1948 | Back | 350—40 |
| 2,578,574 | 12/1951 | Miles | 350—184 |
| 2,859,654 | 11/1958 | Back | 350—184 X |
| 2,945,415 | 7/1960 | Bechtold et al. | 350—184 |
| 3,043,181 | 7/1962 | Brown et al. | 88—1.5 |
| 3,045,545 | 7/1962 | Korones et al. | 350—41 |
| 3,051,052 | 8/1962 | Bergstein | 350—184 |

DAVID SCHONBERG, *Primary Examiner.*

PAUL R. GILLIAM, *Assistant Examiner.*

U.S. Cl. X.R.

350—184, 187